United States Patent [19]

Fujizuka

[11] 4,072,418
[45] Feb. 7, 1978

[54] DEVICE FOR PREVENTING MOVEMENT OF AN ORIGINAL DOCUMENT ON A RECIPROCATING COPIER PLATEN

[75] Inventor: Kaoru Fujizuka, Ebina, Japan

[73] Assignee: Rank Xerox Ltd., London, England

[21] Appl. No.: 667,919

[22] Filed: Mar. 16, 1976

[30] Foreign Application Priority Data

May 29, 1975   Japan .................................. 50-71345

[51] Int. Cl.$^2$ ............................................ G03B 27/62
[52] U.S. Cl. ............................................................ 355/75
[58] Field of Search .................... 355/75, 50, 77, 72, 355/3 R, 75; 24/67, 11, 49 C

[56] References Cited

U.S. PATENT DOCUMENTS

| | | | |
|---|---|---|---|
| 2,009,941 | 7/1935 | Mix ........................................ | 24/49 C |
| 2,686,050 | 8/1954 | De Zelar ........................... | 355/72 X |
| 3,099,269 | 7/1963 | Sörensen ............................ | 24/67.11 |
| 3,825,338 | 7/1974 | Kolibas ................................ | 355/50 |
| 3,997,262 | 12/1976 | Dol et al. ......................... | 355/3 R X |

FOREIGN PATENT DOCUMENTS

| | | | |
|---|---|---|---|
| 898,748 | 12/1953 | Germany ............................ | 24/67.11 |
| 1,050,776 | 2/1959 | Germany ............................ | 24/67.11 |
| 1,017,363 | 1/1966 | United Kingdom ................... | 355/75 |

*Primary Examiner*—Donald A. Griffin
*Attorney, Agent, or Firm*—James J. Ralabate; Clarence A. Green; William A. Henry

[57] ABSTRACT

A device for preventing movement of an original document on the platen of a copier where the platen reciprocates is disclosed having a protrusion that is adapted to adhere to the platen cover. The protrusion is locatable according to the size of the original document being copied and applies pressure in a concentrated area on the platen or the document to prevent movement of the original document while being copied.

1 Claim, 9 Drawing Figures

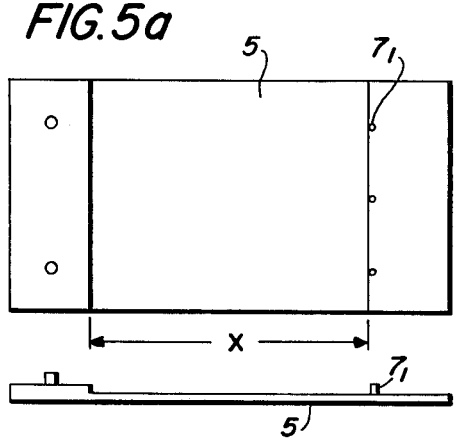
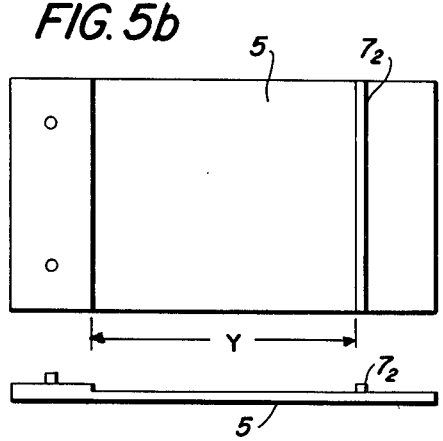
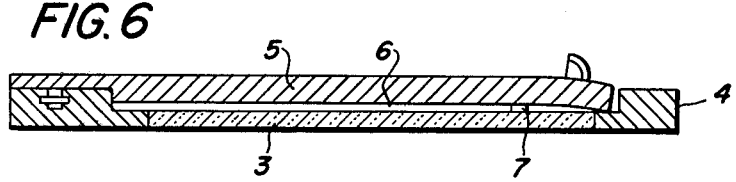
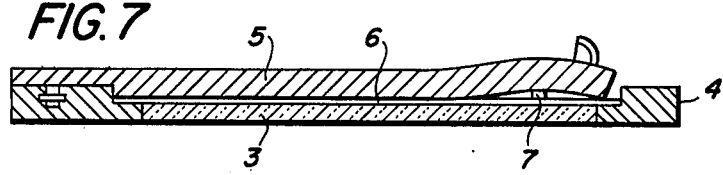
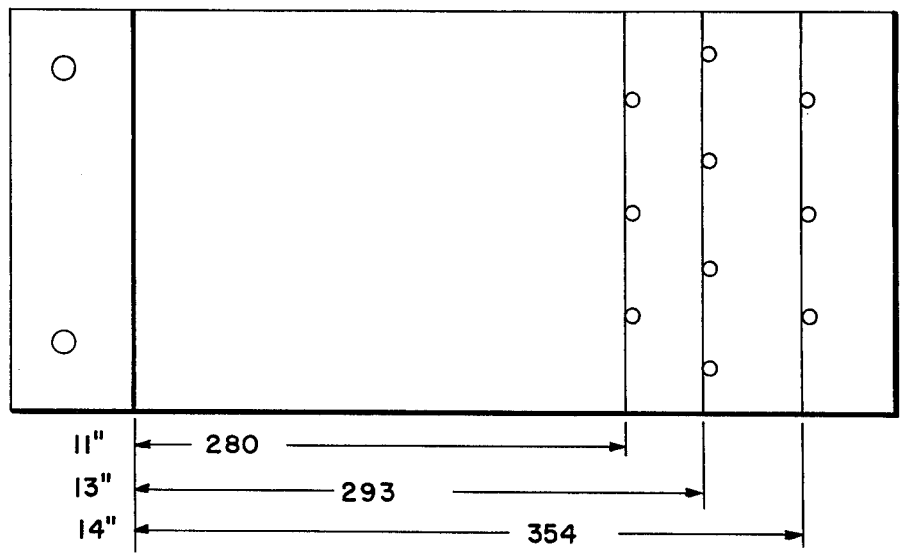

DEVICE FOR PREVENTING MOVEMENT OF AN ORIGINAL DOCUMENT ON A RECIPROCATING COPIER PLATEN

BACKGROUND OF THE INVENTION

This invention relates to a device for preventing movement of substrates on the platen of electrostatic copying machines and more particularly to a device for preventing movement of original documents being copied on electrostatic copying machines employing a reciprocating platen.

Conventionally, the original document on the platen which reciprocates in an electrostatic copying machine has been moved by the impact caused by the reciprocative movement of the platen, and when a plurality of copies are being made, the reproduced image seldom appears at the same position on each copy.

As shown in FIG. 1, a platen 2 on the copying machine body 1 moves reciprocatively in the direction as shown in arrow A in synchronization with the other portions of the copying machine body. This reciprocative movement is subjected to impact more or less when the movement changes in direction from leftward to rightward or from rightward to leftward. The aforementioned platen 2, as shown in FIG. 2, comprises a platen frame 4 which retains a platen glass 3 and a platen cover 5. An original substrate or document 6 is placed between the platen glass 3 and the platen cover 5 in normal operation with the edge of the original document being placed in alignment with the edge of the platen frame 4 as shown in FIG. 3. The substrate 6 moves in the direction as shown by arrow B due to the impact caused by the reciprocative movement of the platen 2, as mentioned above. This movement of the original document 6 is found to be more pronounced when producing a plurality of copies of the same document.

A solution to the above-mentioned problem is required before one can rely on perfectly aligned copies exiting from copying machines employing reciprocating platens.

Accordingly, it is an object of this invention to provide a device for preventing movement of a substrate that is being copied from a reciprocating platen, that is simple in structure.

Yet another object of this invention is to provide a space creation means in association with a platen cover that allows the removal of a document from a platen with the vacuum associated therewith being substantially reduced.

Yet another object of this invention is to provide a pressure concentration means for applying weight to a substrate on the platen of the copying machine in order to prevent movement of said substrate.

SUMMARY OF THE INVENTION

In a copying machine having a platen that moves reciprocatively, an improvement is disclosed for preventing documents from moving while being copied on said platen comprising a platen cover with protrusion means mounted thereto and adapted to apply pressure to said documents in order to prevent movement of said documents while said platen reciprocates during copying.

BRIEF DESCRIPTION OF THE DRAWINGS

For a better understanding of the invention as well as objects and further features thereof, the following detailed description of one example of the invention and the accompanying drawings are provided, which are generally to scale, wherein;

FIGS. 5, A and B are explanatory views of the platen cover of FIG. 4.

FIG. 6 is an elevational cross section of FIG. 4 and,

FIG. 7 is an elevational cross section of FIG. 4 showing a substrate extending beyond the protrusion member;

FIG. 8 is a view showing the reverse side of the platen cover of FIG. 4.

DESCRIPTION OF THE PREFERRED EMBODIMENT

The present invention can be used in any device that requires a means to hold a substrate stationary on a moving platen. However, the invention will be described within the environment of a xerographic reproduction apparatus, for which it is particularly suited.

Figure 1:
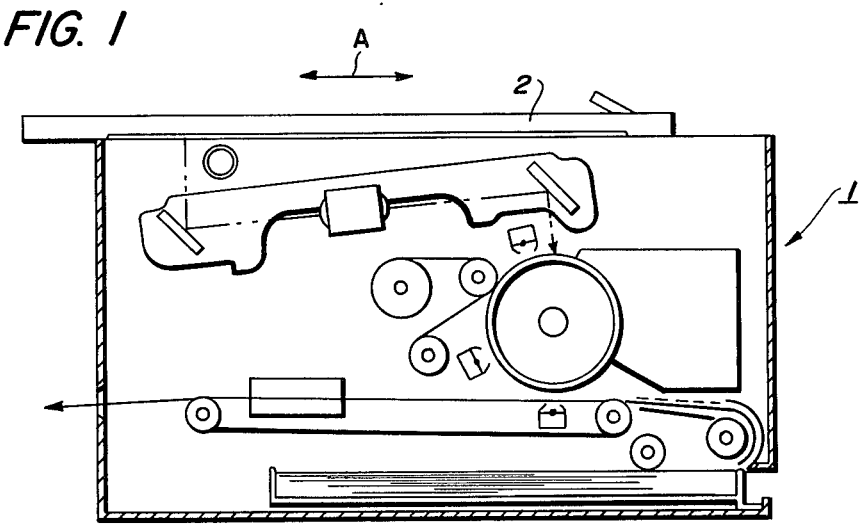
FIG. 1 is a schematic vertical cross section of an exemplary electrostatic copying machine.
Figure 2:
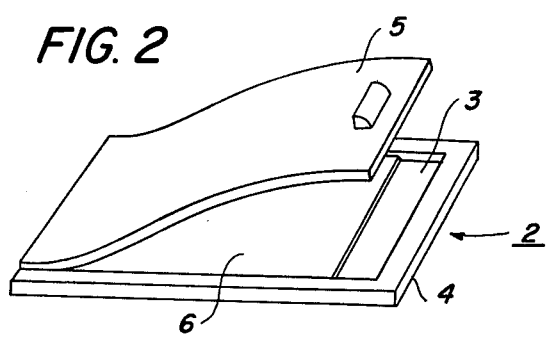
FIG. 2 is a perspective view showing the conventionally used platen.
Figure 3:
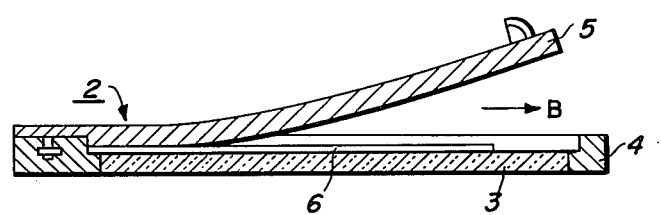
FIG. 3 is a vertical cross section showing the conventionally used platen.
Figure 4:
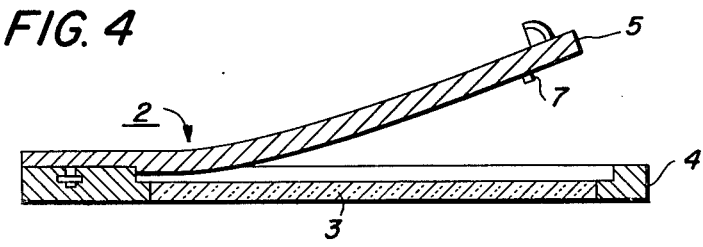
FIG. 4 shows an elevational embodiment of the present invention.

Various platen covers have been designed to answer a number of problems including U.S. Pat. 3,062,110; 3,560,089; 3,560,090; 3,615,134; 3,642,371; and 3,642,376. However, none have been found to answer the problem of movement of original documents on the platen of a reciprocating platen copying machine. The present disclosure answers that problem particularly in reference to FIG. 4, where reference numeral 3 indicates the platen glass, a platen frame 4, and a platen cover 5 with these members being the same as those which have been used heretofore with reference to FIG. 1. On the surface of aforesaid platen cover 5 which faces the platen glass 3 is a removably mounted protrusion 7. The protrusion is preferably located according to the size of the substrate adjacent the front edge thereof and serves as a stop to prevent movement of the substrate. The protrusion can also be a pressure concentration that protrudes toward the platen in acceptable document stopping position, a means for applying weight to the platen cover as well as to a substrate that extends beyond a previously set protrusion member. Once the weighted platen cover is lowered any number of copies can be made from the original document on the platen with all copies being an alignment with each other. The protrusion member or space creating means 7 also serves to facilitate document removal by not allowing a vacuum to build up when the platen cover is closed since through-flow of air takes place.

It is preferred that the protrusion 7 be made spot-like as shown in FIG. 5 (a), or line-like or bar-like as shown in FIG. 5 (b). A synthetic material is preferred for member 7, however, metal could be used instead. The aforementioned protrusion 7 may preferably be set in such a position as to fit the size of a plurality of original documents by attaching the same detachably to the platen cover 5. As is shown in FIG. 6, once the original document is inserted and aligned against the platen frame 4, platen cover 5 with protrusion 7 serves to stabilize the document during recipracatory movement of the platen 2.

Although it is desired that the distance X as shown in FIG. 5 (a) and the distance "y" as shown in FIG. 5 (b) corresponds to the width of the original document 6, larger documents as shown in FIG. 7 can be stabilized without changing the protrusion member since the platen cover 5 is formed of flexible materials.

Generally, original documents have widths determined by regulation and therefore, a means for localizing pressure on substrates 7, may be set at several positions in accordance with the width being used, as shown in FIG. 8.

In conclusion, it may be seen that this invention although simple in structure prevents a substrate from moving due to the impact caused by the reciprocative movement of a platen and does not give adverse influence on the reciprocative movement of the platen due to the weight of the protrusion member 7.

In addition to the apparatus outlined above, many other modifications and/or additions to this invention will be readily apparent to those skilled in the art upon reading this disclosure, and these are intended to be encompassed within the invention claimed herein.

What is claimed is:

1. An electrostatic copying apparatus including a reciprocating platen and a means for facilitating removal of a document from said platen without creating a vacuum hold on said document, said facilitating means comprising:
    a. a platen cover, and
    b. space creating means detachably secured to said cover and adapted when said cover is closed to allow through-flow of air over said document on said platen whereby the vacuum associated with the lifting of the platen cover away from the documents is substantially reduced.

* * * * *